June 19, 1962 — T. ENGEL — 3,039,146
MOLDING APPARATUS
Original Filed April 24, 1956
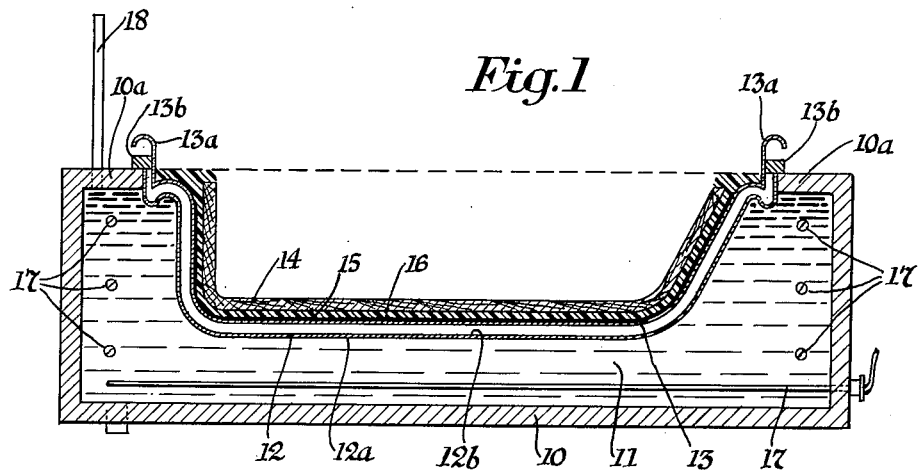
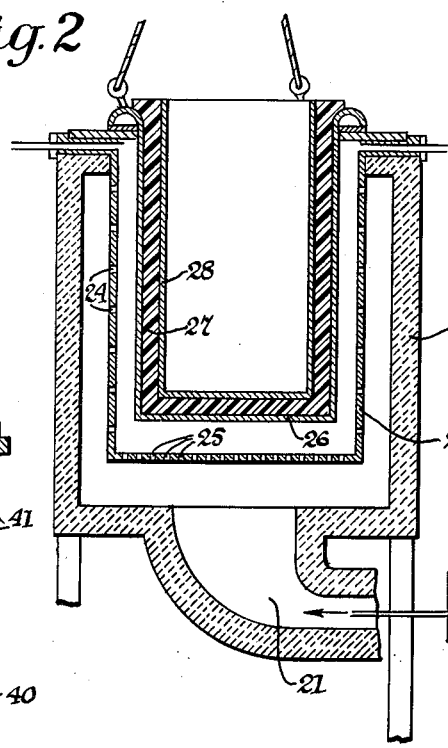
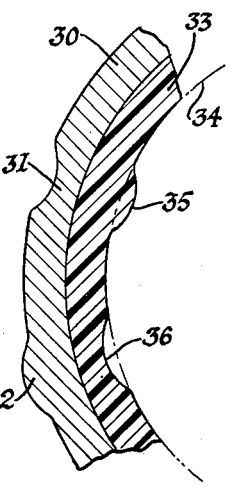
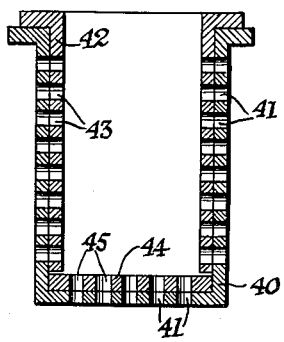
INVENTOR
THOMAS ENGEL
BY Toulmin & Toulmin
ATTORNEYS

United States Patent Office 3,039,146
Patented June 19, 1962

3,039,146
MOLDING APPARATUS
Thomas Engel, Offenbach (Main), Germany, assignor, by mesne assignments, to Vasco Industries Corp., New York, N.Y., a corporation of New York
Original application Apr. 24, 1956, Ser. No. 580,255, now Patent No. 2,915,788, dated Dec. 8, 1959. Divided and this application Dec. 1, 1958, Ser. No. 777,816
10 Claims. (Cl. 18—38)

The present invention relates to an apparatus for manufacturing plastic articles, and this application is a division of co-pending application Serial No. 580,255, filed April 24, 1956, now Patent No. 2,915,788.

As is set forth in the above application, it is known in the manufacture of large numbers of hollow bodies, which are to have an accurately shaped inner or outer surface, to use a model against which the material of which such articles are to be made is applied in the corresponding shape, whereupon the material is cured or set. Generally, a hollow model or form is used, which form corresponds to the outward shape of the articles to be made. The form is filled with an excess of raw material, and after the material has formed a crust or layer on the inner surface of the form, the latter is emptied.

In the manufacture of porcelain figures, for example, the form is a plaster model, on the inner surface of which is a deposit of clay is formed upon the withdrawal of water. In casting pewter or in the production of pewter articles, the crust is formed on a cooled form, while in the manufacture of latex articles a heated form is used. Such heated form is also used in making articles from thermoplastic powder, in which case the powder is permitted to form a film or layer on the surface of the form.

It is also known to produce articles of suitable shape from a thermoplastic material by introducing the material in molten, dough-like or solid condition into a heated rotating hollow mold, from which the finished articles can be removed after the mold has been cooled to just below the melting point of the plastic. According to this method, however, the shape of the articles is limited to generally tubular bodies.

Injection molding and extrusion pressing are also widely used for making articles of thermoplastic material. In the former process, the plastic is liquified by the application of heat and pressure and is injected into metal molds, while in the latter process the plastic is compressed between suitable dies, with the application of heat and pressure, to form certain articles.

All of the above processes impose certain practical size limitations to the articles, above which the equipment cannot be used economically. Also, it has been found that articles made according to known processes and in known apparatus must have a minimum wall thickness, particularly when large surfaces are involved. This is so inasmuch as otherwise the injection pressure which is usually applied would no longer suffice to fill the mold completely.

In order to make possible the manufacture of articles having a wall thickness below such minimum, a special process has been used according to which the articles are made by immersing for a short time a heated core into a plastic powder capable of forming a film in the melting range of the material. The article forming on the surface of the core is subsequently removed therefrom. By means of this process relatively thin-walled articles may be obtained when a single homogeneous layer is used. However, if the wall thickness is to be of the order of 0.5 mm., repeated heating of the equipment and repeated immersion of the core is required. Consequently, the above-described process cannot be used to mass-produce economically large quantities of large self-supporting articles in a single operation because the requisite layer thickness could not be obtained. In any event, it was not possible to obtain any homogeneous layers or even to control the thickness of the layer with any reasonable degree of accuracy. Furthermore, if wall thicknesses consisting of several layers were necessary, a series of operations, corresponding in number to the number of layers, had to be carried out, and it was found that aside from all other disadvantages, the produce thus obtained was usually unserviceable inasmuch as the successively applied layers have a very low adhesive power and thus tend to be detached from one another after but a very short time. Finally, a further disadvantage resulted from the fact that due to the multiple heating and cooling of the mold, the molecular structure of the material was impaired.

The above disadvantages are overcome by the method disclosed and claimed in the above-mentioned application Serial No. 580,225, which is a method for the manufacture of large self-supporting articles from plastic materials capable of forming a film under the influence of heat. According to that method, it is possible to produce large-surfaced and thick-walled articles in a simple manner in a single heating operation, with a minimum of equipment, at low cost. The article is produced in a step-like manufacturing process in which the thickness of the layer can be predetermined so that the latter may be suitably selected and be adapted to practical requirements.

The method described in the above-mentioned application comprises, basically, the steps of introducing the material while at a temperature below the softening range of the plastic material into a mold or molding device while the latter is itself at such temperature, heating the mold on an outer side thereof remote from the plastic material to cause heating of the plastic material through the mold, continuing heating through the mold to cause a film of the plastic material to be deposited on the mold in the form of a layer but without sufficient heating of the plastic material to cause substantial flow of the plastic material in the mold, removing any plastic material which has not become deposited in the formation of the layer, and removing the layer from the mold. The plastic is applied in powdered, dough-like, coarsely or finely granular, or liquid condition. Preferably, the plastic is polyethylene in finely granular form. Under certain circumstances, it may be expedient to mix the plastic material with fillers, such as fillers of a mineral nature, as, for example, calcium carbonate and the like and/or dyes. This may be done partly to reduce the cost of the raw material and partly to impart certain desired properties to the finished article.

It is an object of the present invention to provide an apparatus capable of economically mass-producing large self-supporting articles of plastic material according to the above method, and with this object in view, the present invention resides mainly in the provision of a heating apparatus for heating a hollow mold containing plastic material which, when the mold is heated, is capable of forming a fused layer on the inside of the mold. The heating device itself comprises receiving means adapted to receive the mold and forming a heating surface which has a configuration that is complementary to the outside of the mold, and heating means for heating the heating surface. Thus, when the mold is received by the receiving means, the plastic material in the mold will form a fused layer on the inside of the mold, thereby forming an article having an outer shape corresponding to the inner shape of the mold.

Additional objects and advantages of the present invention will become apparent upon consideration of the following detailed description of the invention when taken in conjunction with the accompanying drawing in which:

FIG. 1 is a sectional elevational view of one embodiment of an apparatus according to the present invention;

FIG. 2 is a sectional elevational view of another embodiment of an apparatus according to the present invention;

FIG. 3 is a fragmentary sectional view of a detail of the present invention; and FIG. 4 is a sectional view of a part usable in conjunction with the apparatus shown in FIG. 2.

Referring now to the drawing and to FIG. 1 thereof in particular, there is shown an apparatus incorporating a suitably insulated receptacle 10 which is adapted to hold a liquid bath 11, and a receiving means in the form of a sheet member 12. This sheet member has a configuration which is complementary to the outer shape of a mold 13 which may be placed into the receiving means 12 in such a manner that the mold is in close proximity to but substantially evenly spaced from the sheet member. In order to facilitate handling of the mold, the latter has suitable handles 13a attached to it, and these handles carry outwardly projecting supporting elements 13b which rest on the upper surface of the lip 10a of the receptacle 10.

In FIG. 1 the mold is shown as containing a core 14, and the space between the outer surface of the core and the inner surface of the mold is filled with thermoplastic material 15 which when the mold is heated is capable of forming a fused layer on the inside of the mold. As mentioned above, the plastic may be in powdered, dough-like, coarsely or finely granular, or liquid condition; preferably the plastic material is polyethylene in powder form. Also, the inner wall of the mold 13 is coated with a layer 16 of a releasing agent, as, for example, paraffin oil.

The liquid bath 11 is heated by suitable electric elements 17. With the outer surface 12a of the sheet member 12 being in contact with the liquid bath 11, the other surface 12b acts as a heating surface from which heat emanates to raise the temperature of the mold. In this way, the plastic material 15 will form a fused layer on the inside of the mold, thereby forming an article having an outer shape corresponding to the inner shape of the mold.

The extent of the action of the heat can be controlled by a suitable measuring device 18 which is interconnected with the heating elements 17 and is so adjusted that the structure of the material to be molded cannot be impaired by depolymerization, decomposition or the like.

The sheet member 12, the mold 13 and the core 14 may be made of any suitable material, such as glass, metal, wood or ceramic or other mineral materials. Thus, the sheet member 12 and the mold 13 may consist of thin tin plate. In order to obtain a smooth surface on the molded article, the inside of the mold 13 may be chromium-plated; alternatively, the mold 13 may be made of heat-resistant glass. It is not essential that in any one apparatus all of these elements be made of the same material, and in one particular apparatus it has been found advantageous to make the sheet member 12 of thin tin plate, the mold 13 of glass, and the core 14 of wood. Plastic and rubber may be also used if they are sufficiently resistant to the temperature reached during the molding process.

The primary function of the core is to reduce the quantity of plastic material required for filling the mold. The core may be made rigid or flexible; in the latter case it may be filled with water or air under pressure so as to transmit this pressure to the plastic material with which the mold is filled. If desired, suitable provision may be made for heating the core.

By virtue of the arrangement, only two elements are used, or three if a core is provided, the shapes of which are adapted relative to each other so as to make it possible for them to accomplish their specific functions. Thus, the elements are not called upon to withstand any pressures, or, when use is made of a flexible core which is subjected to pressure, only this core and the mold will have to withstand a relatively very low pressure. Consequently, the costs of manufacture of the various elements are very low.

The above-described apparatus may be used to carry out the process claimed in the above-identified application Serial No. 580,225. According to that process, plastic material is first introduced into the molding device while the latter is cold, i.e., at a temperature below the softening range of the plastic material. The mold is filled to the brim with plastic material. In order to obtain uniform wall thickness and to make it possible for the process to be carried out without difficulty, it is essential that the molding device be filled while it is exteriorly of the heating apparatus, i.e., in cold condition. If releasing agents are necessary, the same are applied or sprayed in the usual manner on the inside of the mold before the latter is filled. If a core is used, the same is first placed into the mold and the space between the outside of the core and the inside of the mold is filled with plastic material. The thus-prepared mold is placed into the heating apparatus, which may be of the above-described type. Under the action of the heat, the plastic material is deposited and fused in the form of a film or layer on the inside of the mold. The layer thickness of the deposit is determined by the duration of the action of the heat and by the distance of the mold from the heating device. When the desired layer thickness has been attained, the core device, if one has been used, is removed from the mold, and any material that has not fused is removed in any suitable manner, as, for example, by a suction device (not shown). The mold is kept in the heating apparatus so that through the continued action of the heat a smooth surface of the plastic deposit is obtained.

Throughout the process the formation of bubbles is avoided due to the action of the heat from the outside of the mold to the inside, i.e., in the direction toward the outer surface of the mold.

The mold is then removed from the heating apparatus and cooled, for example, to room temperature. It may be expedient to bring about the shrinkage and curing, respectively, of the material by a subsequent cooling process. The article thus made is then removed from the mold and subjected to any further treatment that may be desired.

A very large variety of articles may be made according to the method claimed in the above-mentioned application Serial No. 580,225 by using the apparatus claimed in the instant application, as, for example, refrigerators, covers for engine assemblies, boat parts, bath tubs, car body parts, cases, acid jugs, containers for corrosive substances, buoys, buckets, stirring device containers, sheets, pontoons, bars, exhauster casings, blocks, tubes, vessels, etc. However, irrespective of the shape of the article to be molded, the inner wall and contours of the mold will be similar to the outer wall and contours of the article. Also, in appropriate circumstances one may instead of placing the mold into a similarly or complementarily shaped heating apparatus, do the converse by placing a suitable heating device into a complementarily shaped mold.

The apparatus shown in FIG. 1 can be used in the manufacture of a bath tub which is 600 mm. high, 600 mm. wide, and 1500 mm. long, and which has a wall thickness of 2.5 mm. The tub is made from polyethylene powder which is heated by an oil bath. For this purpose, the bath is constituted by dyphenyl oil which is heated to about 270° C. by the heating elements 17 that are arranged at the bottom and along the sides of the sheet member. The mold 13 which is open at the top has the shape of the tub to be made and is made of thin-walled tin plate 0.5 mm. thick. The mold is placed into the receiving means 12 which has a shape complementary to that of the mold, and the space between the mold and the sheet member is as small as possible.

The tub is made in the following manner:

The diphenyl oil bath is heated to about 270° C. However, the mold itself is prepared exteriorly of the heating apparatus by spreading the inner wall of the mold with the releasing agent 16, by placing the core 14 into the mold, and by thereafter filling the space between the mold and the core to the brim with polyethylene powder. During this time the mold itself is cold, i.e., at a temperature lower than the softening temperature of polyethylene. The thus-prepared mold is then placed into the heating apparatus either by hand or by means of a pully block (not shown). If desired, the mold may be covered so as to prevent heat losses and also to keep the powdered material pure. The heat radiation emanating from the heating surface 12b of the sheet member 12 causes the polyethylene powder in the mold to melt and to form a coherent homogeneous fused layer on the inner wall of the mold. This layer will slowly increase in thickness due to the continued application of heat. Six minutes after the mold has been placed into the heating apparatus, the layer will have attained an overall thickness of 2.5 mm. Were the mold left in the heating apparatus for a total of seven minutes, the thickness of the fused layer would be 3 mm., whereas, if the mold were to remain in the heating apparatus for ten minutes, the overall thickness would be 4 mm. In any event, completion of the molding process is indicated by a suitable timer (not shown).

Moldings of the above thickness of 2.5 mm. can be used as a self-supporting structure. Once this thickness is attained, the cover, if one was used, is removed and the core is pulled out by hand or by means of the pulley block. Any unfused polyethylene powder is removed with a suitable suction device (not shown), and any loose plastic powder that has adhered to the inside of the layer is brushed off.

While the fused layer is already smoothed by this operation, the smoothing becomes complete when the mold is left in heating apparatus for some five minutes longer. The mold is then removed from the heating apparatus and cooled from some three minutes in a water tank which is at a temperature of about 15° C. so that the fused layer may densify and thus shrink. After the mold is cooled, it can be taken out and can be used or treated further.

After the mold has been taken out of the heating apparatus, which is kept at a constant temperature, the latter is ready to receive another mold, so that the heating apparatus may be maintained in continuous operation. In general, at least two molds will be used in conjunction with any one heating apparatus, so that when one mold is being heated, the other is being filled and otherwise prepared. The duration of the whole manufacturing process for the above-mentioned bath tub, which has a total weight of about 10 kg., is fourteen minutes.

FIG. 2 shows another embodiment of a heating apparatus according to the present invention. In this embodiment the apparatus includes a housing 20 which is formed at its bottom with an intake 21 which is in communication with a source of hot air or other heated gaseous medium, this source being indicated schematically at 22. Arranged within the housing 20 is a receiving means in the form of a cup-shaped sheet member 23 the side wall of which is formed with perforations 24 and the bottom of which is formed with perforations 25. Thus, when a cup-shaped mold 26 containing plastic material 27 and a core 28 is placed into the receiving means, the heating surface 23a of the cup-shaped member 23 will be in close proximity to but spaced substantially evenly from the outer surface of the mold 26, and hot air from the source 22 will pass through the perforations 24, 25 toward the outside of the mold, thereby heating the same and causing the plastic material 27 to form a fused layer on the inside of the mold.

In the embodiment shown in FIG. 2, the perforations 24, 25 are of the same cross-sectional area, but there are more perforations 25 per unit area in the bottom of the cup-shaped sheet member than there are perforations 24 in the side wall. This means that the total cross-sectional area of the perforations per unit area of the bottom is greater than the total cross-sectional area of the perforations per unit area of the side wall. Consequently, the bottom will permit the passage of more heated fluid medium than will the side wall, so that during any given time interval the plastic material will form near the bottom a fused layer which is thicker than that formed near the side wall. Therefore, the resulting molded article will be a cup-shaped container having a bottom that is thicker than its side wall.

The following is a description of the manufacture of a 350-liter container of self-supporting construction and with a reinforced bottom:

The molding device 26 is sprayed in the usual manner with a releasing agent (not shown in FIG. 2). The core 28 is then suspended in the mold, and the space between the inner surface of the mold and the outer surface of the core is then filled with plastic powder, in this case again polyethylene. The thus-prepared mold is then placed into the heating apparatus. The hot air, which may be formed by the gases of combustion of an oil-fired heating device at a temperature of about 1400° C. with a feeding capacity of 12 cubic meters per minute, flows through the entire housing 20 and idsistributed to the bottom and side wall of the mold 26 in accordance with the total cross-section of the perforations per unit area of the sheet member 23. Since the article being molded is to have a reinforced bottom, i.e., a bottom thicker than the side wall, the total cross-sectional area of the perforations per unit area of the bottom and the side wall of the sheet member 23 is selected as described above.

After only two minutes, the thickness of the container wall will be 1.5 mm., and after another three minutes this thickness will have reached 4 mm. During this time interval the bottom will have reached a thickness of 5.5 mm. When these thicknesses are attained, the core 28 is withdrawn and the remaining powder is removed. The mold itself, however, remains in the heating apparatus and after two minutes the remaining occluded air has been forced toward the surface of the formed layer by the heat of radiation of the hot air which comes from the outside toward the inside, so that an exceptionally high gloss of the layer is obtained without the thermoplastic material being subjected to any temperature variation.

The mold is then removed from the heating apparatus by means of a crane (not shown). After being cooled, the finished article can be removed and conveyed for any further processing, as, for example, removal of the flash. Meanwhile, a second and possibly a third mold have been prepared, so that about every seven minutes one 350-liter container having a side wall thickness of 4 mm. and a bottom wall thickness of 5.5 mm. is completed.

It will be seen from the above that the thickness of the molded article need not be uniform, but that different thicknesses may be obtained by selecting the perforations in such a manner that certain parts of the mold are exposed to greater heat radiation than other parts. The action of the heat can also be intensified by forming the mold with wall portions of varying thicknesses so that the plastic material will form a thicker fused layer near thin portions of the mold and a thinner fused layer near thick portions of the mold.

Such an arrangement is shown fragmentarily in FIG. 3 in which mold 30 has a recessed portion 31 and a protruding portion 32. Thus, the plastic material will form a layer 33 which at places other than the recessed or protruding mold portions 31, 32, has a thickness 34, but which at the recessed mold portion has a greater thickness 35 and at the protruding mold portion has a smaller thickness 36.

FIG. 4 shows an arrangement wherein the radiation of heat toward the mold can be adjusted. Accordingly, the cup-shaped sheet member 40 having perforations 41 in its bottom and side walls has arranged within it a tubular sleeve 42 having perforations 43 and a disk 44 having perforations 45. With the side walls of the sheet member 40 and sleeve 42 being cylindrical, the sleeve may be rotated within the member 40 so as to occupy different angular positions in which the perforations 41 and 43 are in different degrees of alignment with each other. When the sleeve 42 occupies the position shown in FIG. 4, each perforation is in full alignment with one of the perforations 43, so that the maximum amount of heated air may flow through each perforation 41, 43. However, the amount of air which may flow through can be reduced by rotating the sleeve 42 slightly so as partially to disalign the perforations 43 with the perforations 41. In this way the amount of heated air which will reach the side wall of a mold placed within the sleeve 42 may be controlled.

Similarly, the disk 44 may be rotated so that the perforations 41 and 45 will be in different degrees of alignment with each other so that the amount of heated air which will reach the bottom wall of a mold may be controlled.

It will be understood that this invention is susceptible to modification in order to adapt it to different usages and conditions and, accordingly, it is desired to comprehend such modifications within this invention as may fall within the scope of the appended claims.

What is claimed is:

1. An apparatus for molding articles from a finely divided solid thermoplastic material, comprising a molding receptacle adapted to be filled with a mass of said material, said receptacle comprising an imperforate heat-transmitting receptacle wall the inner surface of which has the configuration of an article to be produced from said material, receiving means for said receptacle defining an open-top chamber into and from which said receptacle is freely movable vertically, and means in said chamber for evenly heating the outer surface of said receptacle wall for the transmission of heat through it and from said inner surface into said mass to form a coalesced layer of said material over said inner surface, said heating means comprising a fixed heating wall the configuration of which is complementary to that of said receptacle wall, said receptacle, when received in said chamber wall having said imperforate arranged in proximity but in substantially evenly spaced relation to said heating wall, and means for maintaining a heating fluid continuously in contact with at least substantially the entire side of said heating wall disposed away from said receptacle wall to maintain said heating wall in a heat radiant condition at a temperature sufficient to heat said receptacle wall to a temperature within the melting range of said material.

2. An apparatus for molding articles from a finely divided solid thermoplastic material, comprising a molding receptacle adapted to be filled with a mass of said material, said receptacle comprising an imperforate heat-transmitting receptacle wall the inner surface of which has the configuration of an article to be produced from said material, receiving means for said receptacle defining an open-top chamber into and from which said receptacle is freely movable vertically, and means in said chamber for evenly heating the outer surface of said receptacle wall for the transmission of heat through it and from said inner surface into said mass to form a coalesced layer of said material over said inner surface, said heating means comprising a fixed heating wall the configuration of which is complementary to that of said receptacle wall, said receptacle, when received in said chamber having said imperforate wall, arranged in proximity but in substantially evenly spaced relation to said heating wall, and means for maintaining a heating fluid continuously in contact with at least substantially the entire side of said heating wall disposed away from said receptacle wall to maintain said heating wall in a heat radiant condition at a temperature sufficient to heat said receptacle wall to a temperature within the melting range of said material, said receptacle wall being formed of shape-retaining thin sheet material of substantially uniform thickness to conduct heat to said material at a substantially uniform rate over all parts of said inner surface.

3. An apparatus as defined in claim 1, different portions of said receptacle wall being formed with different thicknesses so that the coalesced layer of said material formed in a given time of heating will have different thicknesses in the areas next to said different wall portions, with a greater layer thickness next to a receptacle wall portion of lesser thickness.

4. An apparatus for molding articles from a finely divided solid thermoplastic material, comprising a molding receptacle adapted to be filled with a mass of said material, said receptacle comprising an imperforate heat-transmitting receptacle wall the inner surface of which has the configuration of an article to be produced from said material, receiving means for said receptacle defining a chamber having an open-top through which said receptacle is freely movable vertically to and from a molding position within said chamber, and means in said chamber for evenly heating the outer surface of said receptacle wall for the transmission of heat through it and from said inner surface into said mass to form a coalesced layer of said material over said inner surface, said heating means comprising a fixed heating wall the configuration of which is complementary to that of said receptacle wall, said receptacle, when disposed in said chamber having said imperforate wall, arranged in proximity but in substantially evenly spaced relation to said heating wall, and means for maintaining a heating fluid, at a temperature within the melting range of said material, in continuous contact with substantially the entire side of said heating wall disposed away from said receptacle wall, said heating wall being impervious to said fluid but operative to radiate heat from said fluid substantially uniformly to all parts of said outer surface.

5. An apparatus for molding articles from a finely divided solid thermoplastic material, comprising a molding receptacle adapted to be filled with a mass of said material, said receptacle comprising an imperforate heat-transmitting receptacle wall the inner surface of which has the configuration of an article to be produced from said material, receiving means for said receptacle defining a chamber having an open-top through which said receptacle is freely movable vertically to and from a molding position within said chamber, and means in said chamber for evenly heating the outer surface of said receptacle wall for the transmission of heat through it and from said inner surface into said mass and to form a coalesced layer of said material over said inner surface, said heating means comprising a fixed heating wall the configuration of which is complementary to that of said receptacle wall, said receptacle, when disposed in said chamber having said imperforate wall, arranged in proximity but in substantially evenly spaced relation to said heating wall, and means for maintaining a bath of liquid, at a temperature sufficient to heat said receptacle wall to a temperature within the melting range of said material, in continuous contact with substantially the entire side of said heating wall disposed away from said receptacle wall, said heating wall being impervious to said liquid but operative to radiate heat from said bath substantially uniformly to all parts of said outer surface.

6. An apparatus as defined in claim 4, said receptacle wall being formed of shape-retaining thin sheet material of substantially uniform thickness to conduct heat to said material at a substantially uniform rate over all parts of said inner surface, said heating wall being formed of shape-retaining thin sheet material of substantially uniform thickness to radiate heat at a substantially uniform rate to all parts of said outer surface.

7. An apparatus for molding articles from a finely divided solid thermoplastic material, comprising a molding receptacle adapted to be filled with a mass of said material, said receptacle comprising a heat-transmitting wall the inner surface of which has the configuration of an article to be produced from said material, and means for evenly heating the outer surface of said receptacle wall for the transmission of heat through it and from said inner surface into said mass to form a coalesced layer of said material over said inner surface, said heating means comprising a fixed perforated heating wall the configuration of which is complementary to that of said receptacle wall, said receptacle wall being arranged in proximity but in substantially evenly spaced relation to said heating wall, and means for maintaining a heating fluid, at a temperature sufficient to heat said receptacle wall to a temperature within the melting range of said material, in circulation over substantially the entire side of said perforated wall disposed away from said receptacle wall and through the perforations thereof into contact with said outer surface.

8. An apparatus for molding articles from a finely divided solid thermoplastic material, comprising a molding receptacle adapted to be filled with a mass of said material, said receptacle comprising a heat-transmitting wall the inner surface of which has the configuration of an article to be produced from said material, and means for evenly heating the outer surface of said receptacle wall for the transmission of heat through it and from said inner surface into said mass to form a coalesced layer of said material over said inner surface, said heating means comprising a fixed perforated heating wall the configuration of which is complementary to that of said receptacle wall, said receptacle wall being arranged in proximity but in substantially evenly spaced relation to said heating wall, and means for maintaining a heating fluid, at a temperature sufficient to heat said receptacle wall to a temperature within the melting range of said material, in circulation over substantially the entire side of said perforated wall disposed away from said receptacle wall and through the perforations thereof into contact with said outer surface, one portion of said heating wall being formed with perforations which present per unit of wall area a greater passage area for the flow of said heating fluid therethrough greater than do the perforations in another portion of said wall, so that in a given time of heating said material will be coalesced over said inner surface to form a thicker layer in the area opposite said one portion than in the area opposite said other portion.

9. The apparatus defined in claim 8 wherein said perforated heating wall is substantially cup-shaped, and wherein said one portion of said heating wall is the bottom of the cup and said other portion of said heating wall is the side wall of the cup, whereby a cup-shaped article produced in a molding receptacle complementary to said heating wall will have a bottom that is thicker than its sidewall.

10. The apparatus defined in claim 7 characterized by further comprising adjusting means for varying the cross-sectional area of at least some of the perforations of said heating wall.

References Cited in the file of this patent

UNITED STATES PATENTS

| | | |
|---|---|---|
| 11,608 | Hayward | Aug. 29, 1854 |
| 221,013 | Arkell | Oct. 28, 1879 |
| 736,336 | Roberts | Aug. 11, 1903 |
| 1,658,881 | Carpenter | Feb. 14, 1928 |
| 1,824,107 | Wyndham et al. | Sept. 22, 1931 |
| 1,851,251 | Hurliman | Mar. 29, 1932 |
| 2,251,785 | Dons et al. | Aug. 5, 1941 |
| 2,254,227 | Lewis | Sept. 2, 1941 |
| 2,375,944 | Quentin | May 15, 1945 |
| 2,377,177 | Pfleumer | May 29, 1945 |
| 2,438,952 | Grotenhuis | Apr. 6, 1948 |
| 2,527,387 | Arndt | Oct. 25, 1950 |
| 2,588,571 | Porter | Mar. 11, 1952 |